United States Patent [19]
Reid et al.

[11] Patent Number: 5,256,337
[45] Date of Patent: Oct. 26, 1993

[54] PHOTOCHROMIC POLYMER MEMBRANE

[76] Inventors: Jerome L. Reid, 59 Old Sudbury Rd., Wayland, Mass. 01778; Pauline Do, 130 Wiswall Rd., Newton, Mass. 02159

[21] Appl. No.: 926,142

[22] Filed: Aug. 5, 1992

Related U.S. Application Data

[63] Continuation of Ser. No. 510,146, Apr. 17, 1990, abandoned, which is a continuation-in-part of Ser. No. 209,414, Jun. 20, 1988, Pat. No. 5,015,416.

[51] Int. Cl.$^5$ .......................... G02B 5/20; G02B 5/08; G03C 1/06
[52] U.S. Cl. .................... 252/584; 252/586; 430/266; 430/267; 430/567; 430/568; 359/241; 359/609
[58] Field of Search ............... 252/584, 586, 308, 312, 252/310; 430/266, 267, 567, 568, 569; 359/241, 609; 564/603, 605

[56] References Cited

U.S. PATENT DOCUMENTS

| | | | |
|---|---|---|---|
| 3,772,031 | 11/1973 | Berry | 430/605 |
| 4,046,586 | 9/1977 | Uhlmann et al. | 106/194 |
| 4,049,567 | 9/1977 | Chu et al. | 252/300 |
| 4,076,542 | 2/1978 | Deeg et al. | 106/52 |
| 4,110,244 | 8/1978 | Hovey | 252/300 |
| 4,431,730 | 2/1984 | Urabe et al. | 430/604 |
| 4,550,087 | 10/1985 | Kerko et al. | 501/13 |
| 4,844,591 | 7/1989 | Arribart et al. | 350/357 |
| 4,933,265 | 6/1990 | Inoue et al. | 430/378 |
| 5,015,416 | 5/1991 | Reid | 252/586 |
| 5,073,303 | 12/1991 | Reid | 252/584 |

Primary Examiner—Robert L. Stoll
Assistant Examiner—Shean C. Wu
Attorney, Agent, or Firm—Schiller & Kusmer

[57] ABSTRACT

A photochromic material adapted for coating light transmissive materials. The photochromic material contains photosensitive silver halide crystals having dimensions in the range of approximately 50 Angstroms to 800 Angstroms. The silver halide crystals are surface doped with copper ions and another sensitizer selected from mild reducing agents, thioethers, or sulfur-bearing ions and are treated with an agent to accelerate the forward reaction and control the reverse reaction. The accelerants are ions selected from the group consisting of cobalt, chromium, manganese, magnesium, and rare earth metals such as cerium, samarium and europium. The agent for controlling the reverse reaction is one that confers electrical conductivity on the material and while to this end glycerol containing a high concentration of metal ions, methane sulfonic acid and benzyltrimethyl ammonium chloride are useful, the preferred agent is phosphoric acid. The crystals are dispersed in one or more protective polymers that do not irreversibly bind halogen.

17 Claims, 7 Drawing Sheets

PHOTOCHROMIC POLYMER MEMBRANE

This is a continuation of copending application Ser. No. 07/510,146 filed on Apr. 17, 1990, now abandoned, which in turn is a continuation-in-part of Ser. No. 07/209,414 filed on Jun. 20, 1988, now U.S. Pat. No. 5,015,416.

The present invention relates to photochromic materials and more particularly is directed to photochromic polymers. This application is a continuation-in-part of copending U.S. application Ser. No. 209,414 filed Jun. 20, 1988 now U.S. Pat. No. 5,015,416.

The term "photochromic" as used herein is intended to refer to light transmissive materials that exhibit reversible changes in optical transmission depending upon the intensity of ambient, actinic, visible or near visible radiant energy. A number of photochromic compounds are known, of which the currently most useful are silver halides, typically dispersed throughout a matrix of glass. Examples of photochromic glasses are found in U.S. Pat. Nos. 3,208,860, 4,550,087 and 4,076,542, and the references cited therein. Other photochromic materials are known, but many have only limited useful lives. This is especially true of organic photochromic substances that are typically subject to irreversible degradations which reduce the amount of radiation-responsive material available for occluding light.

The major drawbacks to the use of glass as a matrix for photochromic substances are its weight and high cost of manufacture. Attempts have been made to impart silver halide-based photochromic properties to windows, ophthalmic lenses and other articles made from transparent polymeric materials that are lighter and less expensive to manufacture than glass and that mimic properties of photochromic glass. However, such attempts have not been particularly commercially successful.

Where it is intended to incorporate silver halides into a polymeric matrix, the silver halide particles need to be shielded from the chemical effects of the polymerizing materials, e.g. catalysts and initiators that may have a deactivating effect on the photosensitive particles. The deactivating effect is believed to result at least in part from the easy oxidization of elemental silver by, for example, peroxides used as initiators in the casting process. As described in U.S. Pat. Nos. 4,046,586 and 4,596,673, attempts have been made to address this problem, but apparently without commercial success.

A number of interesting techniques have been developed in attempts to duplicate in photochromic polymers, the performance of silver halide particles in a glass matrix. Examples of some of those techniques, which may be considered material to the present invention, are disclosed in the following U.S. patents and the references cited therein: U.S. Pat. Nos. 4,046,586; 4,049,567; 4,106,861; 4,110,24; 4,556,605; 4,578,305; 4,581,283; 4,596,673; 4,489,108 and 4,367,170. It is believed, however, that no viable commercial product has yet been prepared from any of these materials, probably because the materials either could not be cycled through a sufficient number of changes in transmissivity without serious failure, or the materials did not exhibit either fast enough forward or reverse changes in transmissivity.

Accordingly, a principal object of the present invention is to provide a novel photochromic product comprising a polymeric matrix.

Yet another object of the present invention is to provide such a product which exhibits substantial and reversible changes in transmissivity during intervals as short as several minutes.

Other objects of the present invention are to provide such a product for coating light transmissive materials; to provide such a product that is not subject to irreversible degradations that reduce its photochromic activity during the desired life of the product; and to provide such a product for coating light-transmissive, synthetic resin materials to produce photochromic lenses having low haze levels under illumination; and to provide such a polymer that may be coated onto glass and plastic sheets or panes for a wide variety of uses.

The invention accordingly comprises the process and the several steps and relation of one or more of such steps with respect to the others, and the products and compositions possessing the features, properties and relation of elements that are exemplified in the following detailed disclosure, and the scope of the application of which will be indicated in the claims.

Generally, to achieve the foregoing and other objects, the present invention provides an essentially haze-free material comprising silver halide in polymer, the material preferably being applied as a coating to light-transmissive and/or light-reflective substrates. The material contains photosensitive silver halide particles having dimensions in the range of approximately 50 to 800 Angstrom units, the particles being dispersed in a protective colloid that does not irreversibly bind halogen.

A primary use contemplated for the material of the invention is for forming photochromic polymer membranes on light transmissive materials including, but not limited to, ophthalmic lenses, window glazings, skylights, overhangs, car windshields, camera filters, telescopes, binoculars, greenhouses and the like to control UV and visible radiation and glare.

For a fuller understanding of the nature and objects of the present invention, reference should be had to the following detailed description taken in connection with the accompanying drawings wherein.

Figure 1:
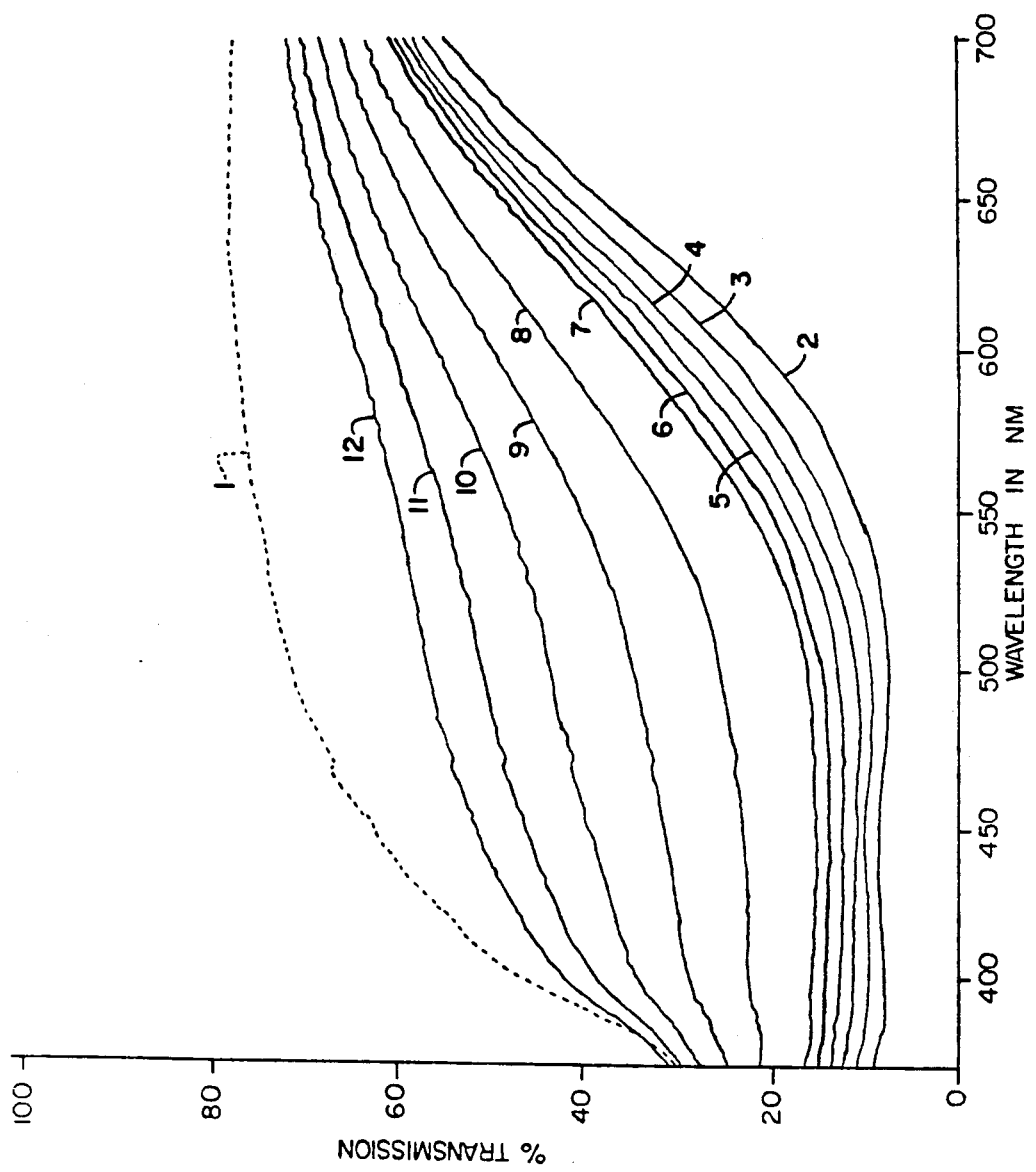
FIG. 1 is a plot of several curves on common axes representing the transmission vs. wavelength at several different times before and following exposure to bright sunlight, of a polymeric membrane prepared in accordance with the principles of the present invention.

The present invention is particularly embodied in a material comprising photochromic silver halide particles in a polymeric matrix and the method of making same, such material being particularly useful in forming polymeric membranes for use with light transmissive materials. An emulsion is preferably first formed of surface-doped, silver halide particles having dimensions in the range of approximately 50 Angstroms to 800 Angstroms, suspended in a solution of a polymer that will not irreversibly bind halogens produced during subsequent photolysis of the silver halide particle. The silver halide particles are typically chosen from the group of AgCl, AgBr and AgI and mixtures thereof, and are initially surface doped or activated with $Cu^+$ or $Cu^{++}$ ions and, optionally, sulfur-bearing compounds.

An agent that will confer electrical conductivity upon the polymeric mixture is added to the latter; such an agent should preferably include an ion capable of existing in several different oxidation states, but some single oxidation stable cations are useable. The desired agent should impart both electron transfer capability and some ionic mobility within the matrix formed after the polymer has been formed into a membrane. Preferably, the polymeric mixture should also include an accelerant (which is selected from a number of different multivalent cations) for the forward reaction, i.e. the photolysis of the silver halide to silver. Finally, a membrane is prepared from the polymeric mixture, as by casting under room, yellow or red light conditions.

In specific detail of the method of the present invention, silver halide particles, which will confer photochromic characteristics upon a polymeric matrix, are synthesized by a continuous nucleation method. To this end, a solution of silver ions may be prepared in an either aqueous or nearly non-aqueous medium. If the particles are to be prepared for use in a non-aqueous solvent-based system, then water may subsequently be removed. The silver cations can readily be provided by dissolving such soluble silver salts as silver acetate, silver trifluoroacetate, silver nitrate, and the like, in water or a suitable protic solvent such as methanol, acetonitrile and the like. The initial concentration of the silver ions in solution can vary widely, for example from as low as 0.001 to as high as 7.0 molar and even higher, but is preferably lowered for use in the formation of the silver halide particles. A water soluble polymer that will not bind either silver or halide ions irreversibly (typically polyvinyl pyrrolidone, polyvinyl alcohol, polycarboxylic acids, polysulphonic acids, polyethers, and copolymers thereof, and the like), is added in a low concentration, preferably not more than 10 wt %, to provide a protective environment for controlled silver halide grain growth. Growth controlling addenda and monomeric or polymeric surfactants may optionally be added.

A second solution containing halide salts is also prepared. The halide salts are typically provided as aqueous salt solutions of such soluble halide salts as ammonium, quaternary ammonium, alkali metal (e.g. lithium, sodium or potassium), or alkaline earth metal (e.g. magnesium or calcium) halides, and can be one or more of the several halides such as bromides, iodides and chlorides in such proportions as may be desired. The initial halide salt solution may also vary widely in concentrations between from 0.001 to higher than 7.0 molar, but should be reduced to around 0.1 M or less for use. As in the silver solution, there may be also added less than 10 wt % of a protective water-soluble polymer that will not irreversibly bind silver or halide ions, the polymer being for convenience, but not necessarily, the same as that used in the silver solution.

The silver ion and halide ion solutions, adjusted to preferably 0.1 M or less, are then mixed together, preferably in stoichiometric quantities or with a slight excess of halide ion to provide a net negative charge that will aid in maintaining the stability of the silver halide formed. Mixing should take place while controlling such parameters as temperature, ion concentrations, pH, agitation and the like, so as to promote a reaction that will form silver halide particles of the most advantageous size and shape for photochromic use, typically a Lippman-type emulsion in which the silver halide particles are of colloidal dimensions. The silver halide particles are preferably synthesized by a continuous nucleation method, employing triple or double jet precipitation techniques. The size of the particles formed should be less than about 800A and preferably less than 500A. The precise control of shape and size of the particles can be readily achieved using well established methods for the preparation of silver halide emulsions for photographic use.

After the first and second solutions are mixed and the silver halide particles formed, a crystal growth inhibitor may be added to the emulsion to retard the growth of the silver halide particles and maintain the particle size below 800 Angstrom units. Examples of well known and commercially available silver halide growth inhibitors, suitable for use in the present invention, are 1H-purin-6-amine (sold as Adenine by Eastman Kodak Co., Rochester, N.Y.), guanine and 1-phenyl-5-mercaptotetrazole (available as PMT from Fairmount Chemical Co., Inc., Newark, N.J.). A list of growth regulators and stabilizers is provided in U.S. Pat. No. 4,400,463. Alternatively, the silver halide particles may be Ostwald ripened prior to stabilization. Preferably, in either case, the particle size distribution will be very narrow with the grains uniformly sized.

In the preferred embodiment, the silver halide particles formed will be relatively homogeneous in composition, and may be formed as a mixed halide. It is contemplated, however, that the particles can be varied so that the central region may be of a different silver halide composition than the laterally surrounding region. For example, the particles may be formed with an AgI core surrounded by an AgClBr shell. Alternatively, the particles may be formed with an AgClBr core surrounded by an AgI shell.

As an alternative to the mixing of silver and halide salts from aqueous solutions, it is possible to introduce the silver and halide salts initially or in the particle growth stage in the form of fine silver halide grains suspended in a dispersing medium. The grain size is such that they are readily Ostwald ripened onto larger grain nuclei, if any are present once introduced to the reaction vessel.

The silver halide particles are then washed and concentrated using conventional washing techniques to remove excess salts and other soluble materials deleterious to the desired photochromic performance of the silver halide. Ultrafiltration (for example through a Millipore filter with a cutoff as low as 10,000 molecular weight) is the preferred method for washing the silver halide particles because this technique removes not only excess water with dissolved and undesirable salts therein, but by selection of an appropriate molecular weight cut-off may be used as a preferred separation technique to remove a substantial portion of the water-soluble polymer that had been used to provide the protective environment for the formation of the silver halide particles. The silver halide particles may also be washed using flocculation and/or decantation or other techniques known in the art, provided that they do not introduce anionically charged substances that deleteriously react with the multivalent cations subsequently used in the process of the invention to provide photochromic activation.

After washing and concentrating the essentially photochromically inactive silver halide particles, the protective polymer removed in the washing process may be replaced with a higher molecular weight polymer or another protective polymer which does not irreversibly bind halogens. The replacement polymer may be a water-dispersible, film-forming polymer that is mixed with the silver halide grains in the form of an emulsion. This substitution of polymers permits one to form the final dispersion with a polymer selected for a predetermined quality such as superior mechanical strength, or for some predetermined usage such as incorporation into a relatively high temperature laminating process. Ions such as $Cu^{++}$, $Cu^+$ or combinations thereof, together with sulfur-bearing ions such as are selected from the group of $S^=$, $R-S^-$, $S_2O_3^=$, or combinations thereof (R being an organic radical such as an alkyl, alkylidene, alkene, alkadiene, aryl, alkaryl and the like) are added to the emulsion in a concentration of $10^2$ to $10^5$ parts per million (based on the silver content of the emulsion) to surface dope the silver halide particles and serve as photoactivating agents. Alternatively, in lieu of or in addition to sulfur-bearing ions as activating agents, one can also use thioethers such as 2, 2'thiodiethanol, and/or a mild reducing agent, such as ascorbic acid, having a redox potential of less than about 235 mv. at pH 6.5 (measured against a standard hydrogen electrode), provided also that the reducing agent chosen does not impair the colloidal qualities, particularly the silver halide particle size on the emulsion. Such reducing agents are added in an amount between 0.01 to 50 mol percent based on the weight of silver.

In the preferred embodiment of the present invention, photoactivation of the particles is accomplished by a combination of cupric halide and sulfur-containing compounds such as $Na_2S_2O_3$, $Na_2S$, or some mercapto-containing compounds such as, surprisingly, residual 1-phenyl-5-mercaptotetrazole (PMT) that had been used to inhibit growth of the silver halide particles initially and that remains on the particles after washing and concentration, although PMT in conventional photographic systems is considered a potent inhibitor of photo-sensitive activity. The sulfur is believed to improve the quantum efficiency of the photochromic reaction. The activating ions surface dope the silver halide particles to maximize their photosensitivity and photochromic properties. Importantly, the inclusion in the final emulsion of ions of such diverse materials as cobalt, magnesium, manganese, chromium and rare earth metals such as particularly cerium, europium, samarium and the like, typically derived from the halides thereof, all may serve as accelerants of the forward reaction in the context of the present invention.

While it is postulated that the concentration at which copper ions are added to the emulsion serves to control, at least in part, the reverse reaction (i.e. the conversion of silver to silver halide), the addition in the present invention of an agent that confers electrical conductivity (e.g. a specific conductance of greater than about $1 \times 10^{-4}$ ohms$^{-1}$/cm$^{-1}$ at 3° C.) on the final membrane formed, has been found to confer a large measure of control over that reverse reaction in the latter. Phosphoric acid (typically in the orthophosphoric form), a known polyelectrolyte, is the preferred agent that confers the desired electrical conductivity. Other materials, such as methane sulfonic acid, quaternary ammonium halides such as benzyltrimethylammonium chloride and trimethylammonium chloride, and even glycerol containing a high concentration (e.g. up to 3 moles for each mole of silver in the emulsion) of metal salts (such as those already present in the form of copper salts and the metal salts added as forward accelerants), and the like are useful as such agents to confer electrical conductivity. It is postulated that the inclusion of such agents confers mobility on ions in the membrane and allows more rapid electron transfer to occur during the redox reactions particularly involving the conversion of copper ions from their reduced to oxidized form and the conversion of silver to silver halide.

Polymers which meet the requirements for reversibly donating halogen back to the hydrolyzed silver on removal of irradiation are those which loosely bind halide ion, and which are capable of donating back the halogen on removal of radiation. The reverse reaction will also be enhanced by arranging to have the polymer contain at least 50% halogenated groups. Some examples of useable polymers include but are not limited to poly-4-vinyl pyridine, poly-2-vinyl pyridine, polyvinyl pyridine halides, polyvinyl imidazoles and their halides, polylysine, polyvinyl alcohol, polyvinyl pyrrolidone, polyvinylidine chloride, polyvinyl chloride, polyethers, polycarboxylic acids, polysulphonic acids, polymeric quaternary ammonium halides such as polyvinylbenzyl trimethylammonium chloride and polyvinyl pyridium halides, cellulosic carboxylates, cellulosic sulphates, cellulosic ethers, copolymers thereof and mixtures thereof.

Surfactants such as lauroamphodipropionate (commercially available as Miranol H$_2$M-SF from Miranol Inc., South Brunswick, N.J.), sodium dioctyl sulfosuccinate (commercially available as Aerosol OT from American Cyanamid, Wayne, N.J.), and octylphenoxy polyethoxy ethanol (commercially available as Triton X-100 from Rohm and Haas, Philadelphia, Pa.), may be added to the emulsion to promote wetting of the polymer substrate during coating.

The resulting emulsion of surface-activated silver halide in suspension with a suitable polymer as described above is preferably held at a final pH of less than about 6.5, preferably in the range of 1.5 to 4.5. This emulsion can then be cast as a film on glass or other non-adherent substrate, followed by drying to remove substantially all water or other solvents or suspending phase and stripping the dried emulsion from the substrate to provide an unsupported membrane. Alternatively, the emulsion can be coated onto an appropriate polymeric, transparent substrate film and dried. The photochromic emulsion may be coated onto a substrate by dipping, spraying, spin coating, flow coating, or the like to form a continuous polymeric membrane of between 1-30 microns on the surface. The membrane or film, with or without the use of solvents or adhesives, can then be bound, for example as a plastic laminate, between eyeglass lens elements formed for example from polycarbonate, cellulose acetate butyrate, polyester, polyvinylchloride, CR-39 stock or the like, or adhered to glass or polymeric window panes, or onto other light transmissive materials. The percent luminous transmittance in the presence of actinic radiation of the final laminate may be varied by adjusting the thickness of the polymeric membrane, the amount of activation, and the concentration of the photochromic material.

The present invention is further illustrated by the following examples, but these examples should not be used to limit the present invention.

EXAMPLE

A first solution was prepared by mixing together 0.185 liters of 1% w/v polyoxypropylenepolyoxyethylene block copolymer (commercially available as Pluronic 31R1 from BASF Wyandote Corporation, Parsippany, N.J.; CAS Registry #9003-11-6) with 179 liters of deionized water, and adding 807.3 g. of $AgNO_3$. After thorough mixing, deionized water was added to bring the solution to 180 liters.

A second solution was also prepared by mixing together in 163 liters of deionized water, 0.185 liters of the same 1% w/v polyoxypropylenepolyoxyethylene block copolymer, 226 g. of KBr, 154.4 g. of NaCl, 39.4 g. of KI, and 6.3 liters of Aerosol OT (1% w/v). This mixture was mixed with continuous stirring into 9.5 liters of polyvinylpyrrolidone (PVP K-15, 5% w/v, av. —molecular weight of 10,000—) and deionized water added to 180 liters.

The first and second solutions were then simultaneously jetted into the inlet side of a continuous nucleation reactor device with a residence time of 0.23 milliseconds. The vessels in which mixing had occurred and the reactor were washed with 10 liters of water respectively. The particle size was monitored by use of a turbidity meter at five minute intervals until a precalibrated reading indicative of an average particle size of 100 A was achieved. Then, 7.5 liters of 0.05 M 1-phenyl-5-mercaptotetrazole (i.e. PMT) was jetted into the stirred mixture over a three minute period.

The dispersion was ultrafiltered using an Amicon ultrafiltration unit equipped with 40 square feet of 30,000 molecular weight cutoff membrane. When the volume was reduced to 40 liters, 10.5 liters of 5% w/v polyvinylpyrrolidone (PVP K-90 with an average molecular weight of about 360,000) mixed with 29.5 liters of deionized water was added. Ultrafiltration was again performed until the volume reached 40 liters, another 40 liters of deionized water was added and the ultrafiltration process repeated yet again until the conductivity of the filtrate reached 70 microohms/cm. The ultrafiltration membrane area was reduced to 10 square feet and a final reduction of volume was carried out to provide a concentration of approximately 0.3 molar with respect to silver. The silver recovered was in excess of 95% of that initially charged.

EXAMPLE 2

A film-forming dispersion was made by mixing 8.50 ml. of water, a surfactant in the form of 0.50 ml. 3% w/v octylphenoxy polyethoxy ethanol (commercially available from Rohm & Haas Co., Philadelphia, Pa. as Triton X-100; CAS registry #9002-93-1); 5.0 ml. of a mixture of surface doping sensitizers formed from 0.50M $CuCl_2$ and 0.50 M thioglycerol; and 6.0 ml. of 0.334 M (i.e. 2 mmoles) of silver halide emulsion prepared as in Example 1.

The dispersion was spread uniformly to provide 75 mg $Ag/ft^2$ on a cellulose acetate substrate and dried. The dried coating was laminated to a sheet of cellulose acetate using methanol and further dried for hours in a 50° C. oven before cooling. A portion of the resulting laminate was exposed for 1 hour to bright sunlight, after which the sample was placed in a Hitachi Model 3410 spectro-photometer and scanned at a scan speed of 1200 nm/sec from 380 to 700 nm. Shown in FIG. 1 are a number of curves numbered 1 through 12 representing respectively transmission for times as follows:

| | |
|---|---|
| 1 | Unexposed |
| 2 | After 1 hour exposur |
| 3 | After 1 minute in dark |
| 4 | After 2 minutes in dark |
| 5 | After 3 minutes in dark |
| 6 | After 4 minutes in dark |
| 7 | After 5 minutes in dark |
| 8 | After 10 minutes in dark |
| 9 | After 15 minutes in dark |
| 10 | After 20 minutes in dark |
| 11 | After 3 minutes in dark |
| 12 | After 30 minutes in dark |

EXAMPLE 3

Figure 2:
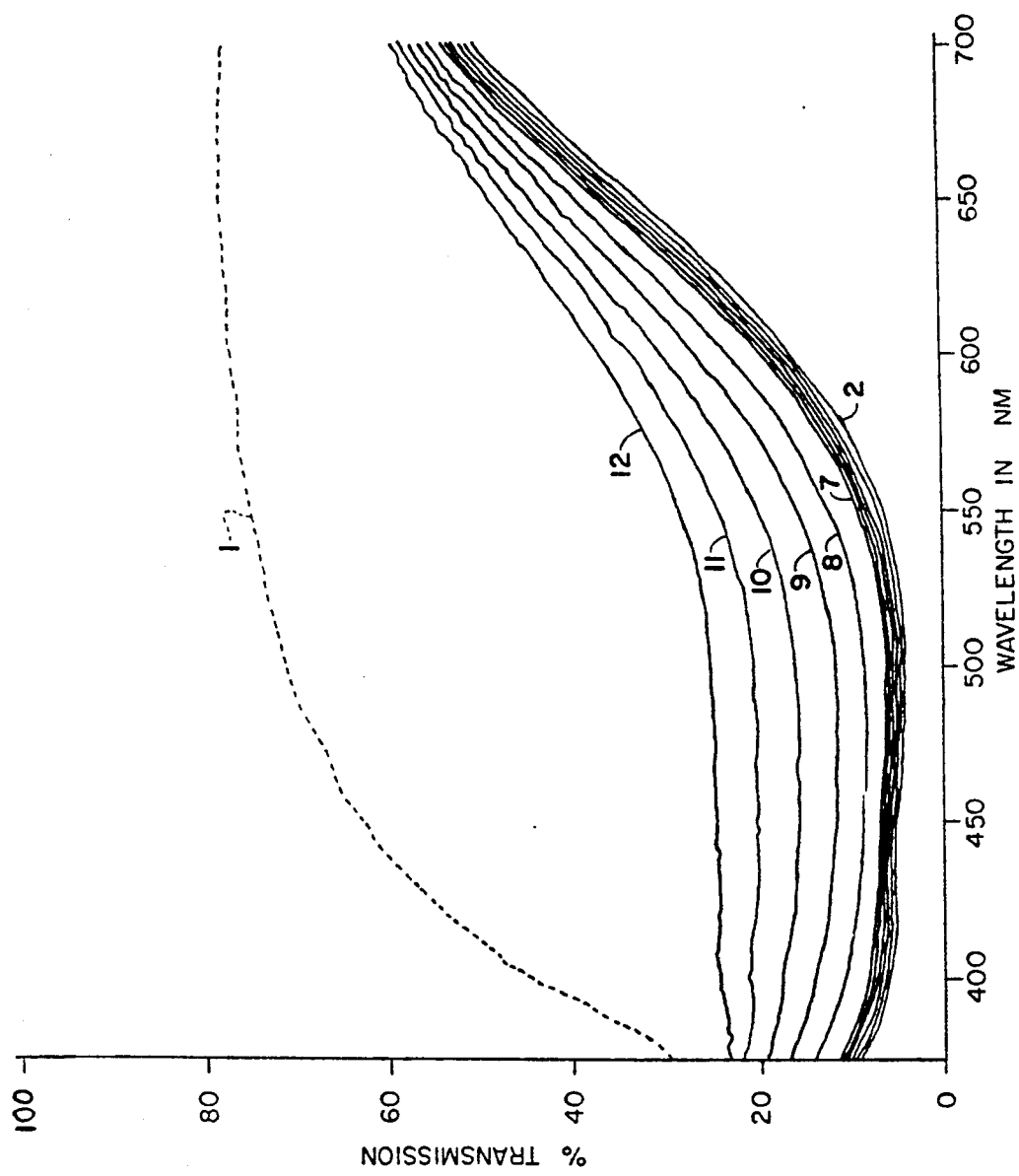
FIG. 2 is another plot of several curves representing the transmission vs. wavelength at several different times before and following exposure to bright sunlight, of another polymeric membrane prepared in accordance with the principles of the present invention.

A laminate made as in Example 2 was exposed for 2 hours to bright sunlight, after which it was placed in the same spectro-photometer and scanned as described in Example 2. FIG. 2 shows a number of curves numbered 1 through 12 representing the transmissions measured for the same times as indicated in the table in Example 2 except for curve #2 which was, of course, taken after two hours of exposure.

EXAMPLE 4

Figure 3:
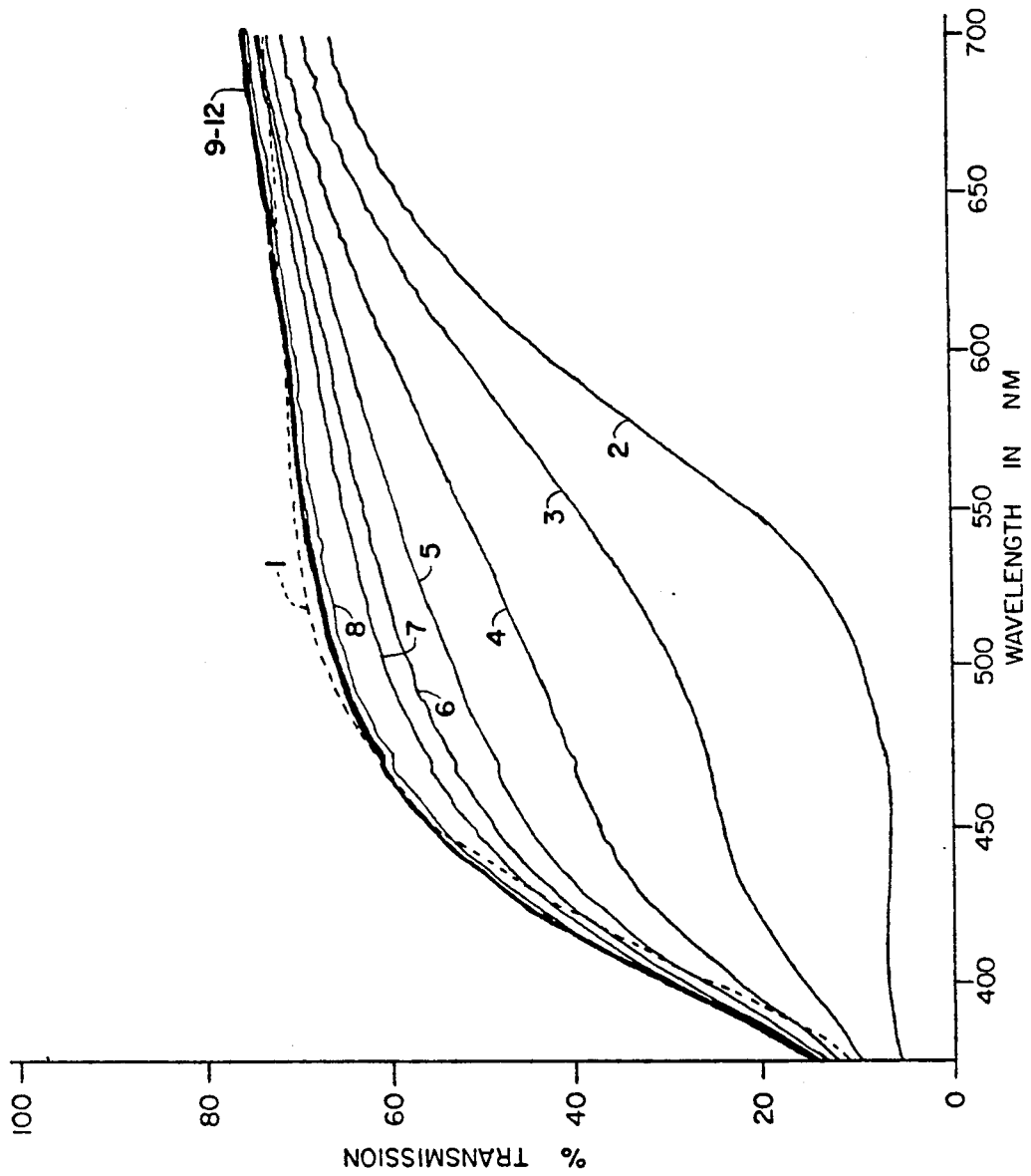
FIG. 3 is another plot of several curves representing the transmission vs. wavelength at several different times before and following exposure to bright sunlight, of still another polymeric membrane prepared in accordance with the principles of the present invention.

A laminated film was prepared as described in Example 2, except that, for each mmole of Ag in the emulsion, additional PVP was added to bring the total to 3.0 mmoles. Instead of $CuCl_2$, 0.5 mmoles of copper acetate were used together with 1.0 mmole methane sulfonic acid and 2.5 mmoles of glycerol to control the reverse reaction. In addition, 1.0 mmole 2, 2'dithiodiethanol ($OH—CH_2—CH_2—S—CH_2—CH_2—OH$) and 0.3 mmoles $CeCl_3$ were added as forward reaction accelerants. The film was tested as described in Example 3; the resulting sensitometer readings are shown in FIG. 3 with the curves being numbered with the same significance as in FIG. 2.

EXAMPLE 5

Figure 4:
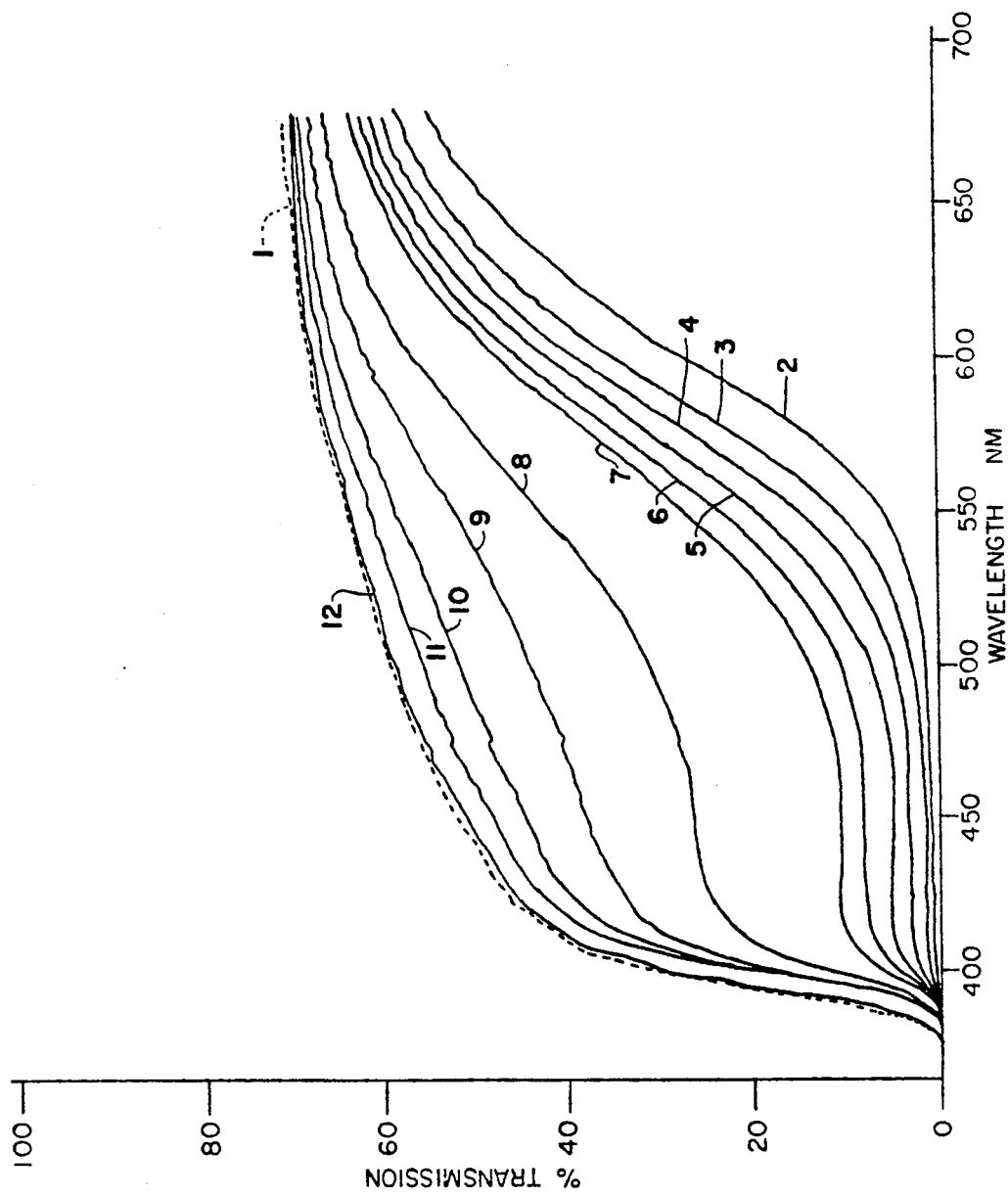
FIG. 4 is another plot of the type shown in FIG. 2 with respect to yet another polymeric membrane prepared in accordance with the principles of the present invention.

A film was prepared as described in Example 2, except that, for each mmole of Ag in the emulsion, instead of $CuCl_2$, 0.5 mmole of copper acetate was used together with 1.0 mmole methane sulfonic acid and 6 mmoles glycerol. In addition, for each mmole of Ag in the emulsion, 0.5 mmole $CeCl_3$ was added as a forward reaction accelerant. The film was tested as described in Example 3; the resulting sensitometer readings are shown in FIG. 4 with the curves being numbered with the same significance as in FIG. 2.

EXAMPLE 6

Figure 5:
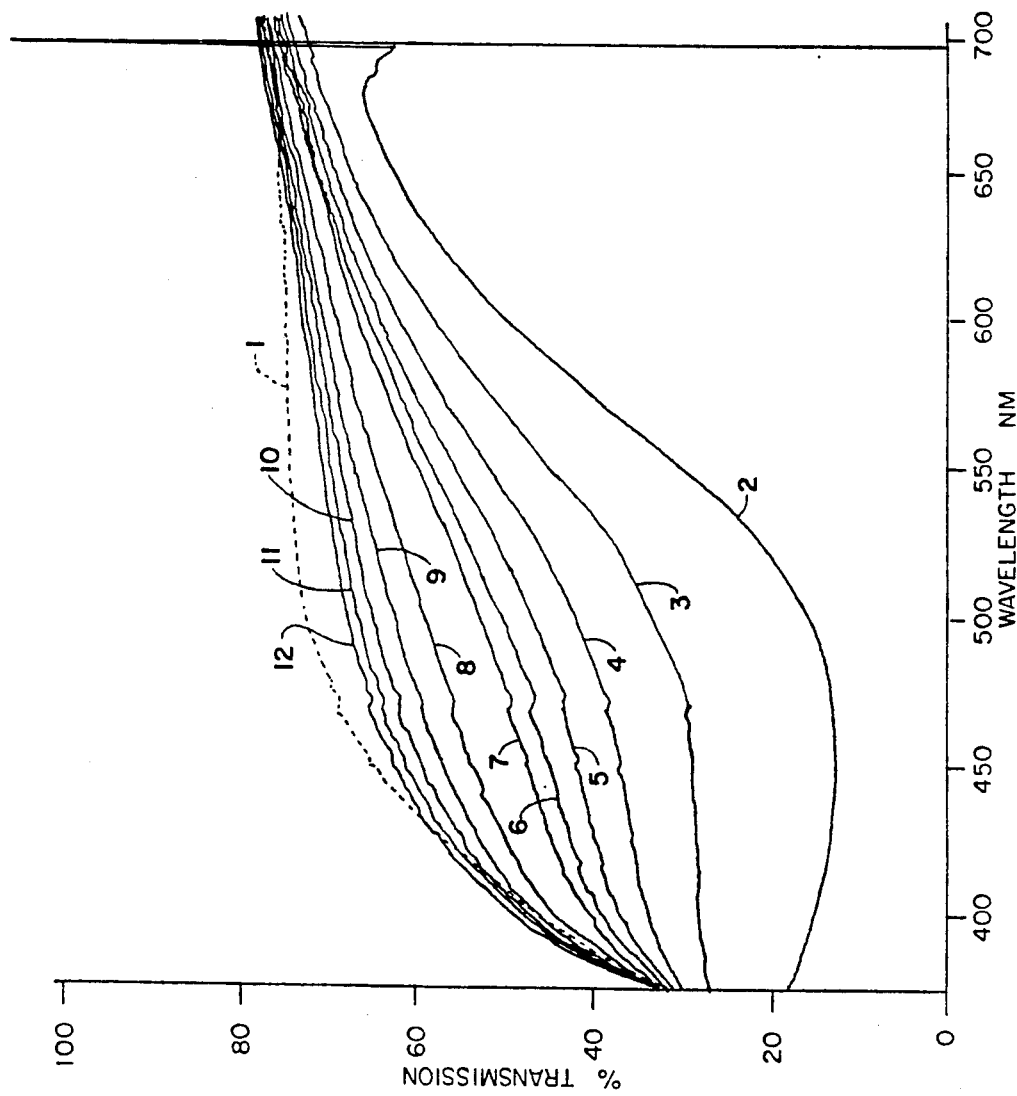
FIG. 5 is yet another plot of the type shown in FIG. 2 with respect to yet another polymeric membrane prepared in accordance with the principles of the present invention.

A film was prepared as described in Example 2, except that, for each mmole of Ag in the emulsion, 0.75 mmole $CuCl_2$ was used together with 6.0 mmoles orthophosphoric acid to control the reverse reaction. In addition, for each mmole of Ag in the emulsion, 0.25 mmole $CoCl_2$ and 0.25 mmole $MgCl_2$ were added as forward reaction accelerants. The film was tested as described in Example 3; the resulting sensitometer readings are shown in FIG. 5 with the curves being numbered with the same significance as in FIG. 2.

EXAMPLE 7

Figure 6:
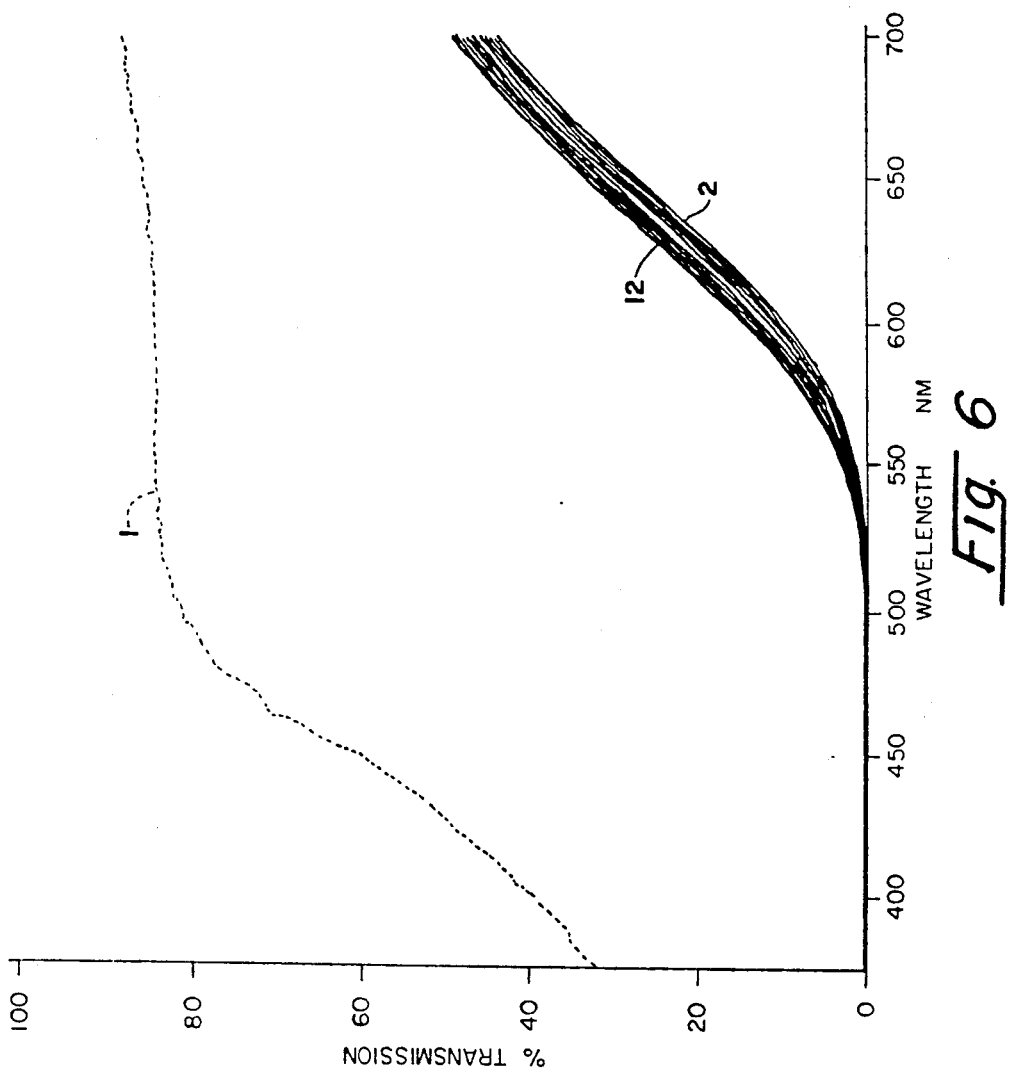
FIG. 6 is yet another plot of the type shown in FIG. 2 with respect to yet another polymeric membrane prepared in accordance with the principles of the present invention.

A film was prepared as described in Example 6 with the following changes: the $CuCl_2$ was 0.5 mmole and no $CoCl_2$ or phosphoric acid were used. The film was tested as described in Example 3; the resulting densitometer readings are shown in FIG. 6 with the curves being numbered with the same significance as in FIG. 2.

As is apparent from Examples 1-7 inclusive, the speed of the reverse reaction shown in FIG. 1 is considerably increased by the addition of the agents conferring electrical conductivity on the film. Particularly as shown in Example 7, the back reaction is almost nonexistent (particularly where the emulsion contained a forward reaction accelerant) in the absence of an agent such as phosphoric acid, methane sulfonic acid or the like.

Figure 7:
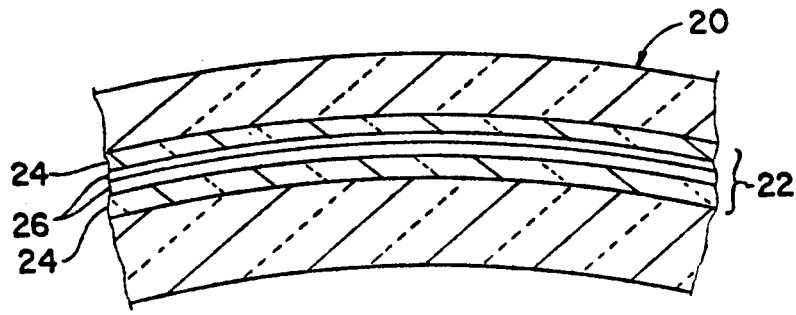
FIG. 7 is a schematic cross-sectional representation of an ophthalmic lens incorporating the membrane of the present invention.

As noted, one preferred use for the photochromic emulsion is for laminating onto lens elements used to make eyeglass lenses which are clear and transparent in low light. As shown in FIG. 7 in cross-section, such a lens 20, includes laminate 22 formed of a pair of sheets 2 of substrate material such as polyester coated with respective membranes 26 of the emulsion of the invention, the laminate being formed by contacting the emulsion surfaces of the two sheets in face to face relation with one another. The double membrane of dried emulsion is thus protected within the outer layers provided by sheets 2. Laminate 22 then is incorporated by known techniques into appropriate and known polymeric ophthalmic lens materials or transparent resins such as polycarbonates, acryl resins, CR-39 resins, polystyrenes, polyesters, cellulose acetate butyrate and the like.

Figure 8:
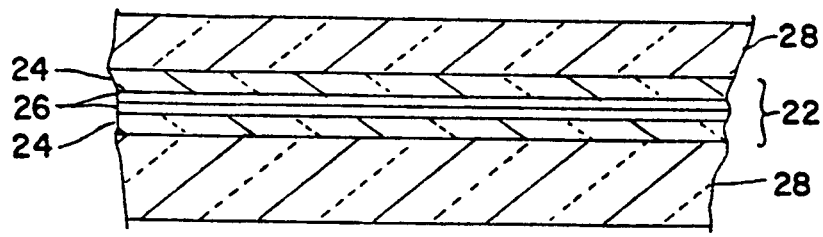
FIG. 8 is a schematic cross-sectional representation of a window pane incorporating the membrane of the present invention.

Similarly, one can incorporate laminate 22 between flat panes or sheets 28 of plastics or glass to form photochromic windows as shown in FIG. 8.

Even though the advantages and characteristics of the invention have been set forth in the foregoing description, together with the details of the structure and function of the invention, it is understood that the disclosure is illustrative only. The present invention is indicated by the broad general meaning of the terms in which the appended claims are expressed.

What is claimed is:

1. A photochromic emulsion for coating light transmissive materials comprising:
   photosensitive silver halide particles having dimensions in the range of approximately 50 Angstroms to 800 Angstroms, said silver halide being surface-sensitized;
   a polymeric colloidal suspending agent for protecting said silver halide particles, said agent being selected so as to not irreversibly bind halogens produced during photolysis of said silver halide particles: and
   a secret agent for conferring electrical conductivity on said emulsion.

2. A photochromic emulsion according to claim 1 wherein said second agent is selected from the group consisting of phosphoric acid, methane sulfonic acid, benzyltrimethylammonium chloride, trimethylammonium chloride, and glycerol containing a high concentration of metal salts.

3. A photochromic emulsion according to claim 1 wherein said second agent is phosphoric acid.

4. A photochromic emulsion according to claim 1 wherein said second agent is methane sulfonic acid.

5. A photochromic emulsion according to claim 1 wherein said second agent is benzyltrimethylammonium chloride.

6. A photochromic emulsion according to claim 1 wherein said second agent is glycerol containing a high concentration of metal salts.

7. A photochromic emulsion according to claim 1 including an accelerant for the forward photochromic reaction.

8. A photochromic emulsion according to claim 7, wherein said accelerant is selected from the group consisting of ions of cobalt, chromium, manganese, magnesium, and the rare earth metals, and combinations thereof.

9. A photochromic emulsion according to claim 1 wherein said silver halide particles are chosen from the group consisting of AgCl, AgBr and AgI and combinations thereof.

10. A photochromic emulsion according to claim 1 wherein said silver halide particles are surface-doped with ions chosen from the group consisting of $Cu^{++}$, $Cu^+$ and combinations thereof, and also with a sensitizer selected from the group consisting of (1) a thioether, (2) a mild reducing agent selected so as not to impair the colloidal qualities of said emulsion, (3) an ion selected from the group consisting of $R-S^-$, $S_2O_3^=$, $S^=$, or combinations thereof, R being an organic radical, and (4) combinations thereof.

11. A photochromic emulsion according to claim 1 wherein said silver halide particles are surface-doped with ions chosen from the group consisting of $Cu^{++}$, $Cu^+$ and combinations thereof, and also with a thioether.

12. A photochromic emulsion according to claim 11 wherein said thioether comprises 2, 2'thiodiethanol.

13. A photochromic emulsion according to claim 1 wherein said silver halide particles are surface-doped with ions chosen from the group consisting of $Cu^{++}$, $Cu^+$ and combinations thereof, and also with a mild reducing agent.

14. A photochromic emulsion according to claim 13 wherein said reducing agent is ascorbic acid.

15. A photochromic emulsion according to claim 10 wherein said ions are added to said emulsion in a range of concentrations of about $10^2$ to $10^5$ parts per million based on the silver content of said emulsion.

16. A photochromic emulsion according to claim 10 wherein said $R-S^-$, $S_2O_3^=$ and $S^=$ ions are provided by one or more compounds chosen from the group of $Na_2S_2O_3$, $Na_2S$, 1-phenyl-5-mercaptotetrazole and mixtures thereof.

17. A photochromic emulsion according to claim 1 wherein said colloid includes a polymer selected from the group consisting of poly-4-vinylpyridine, poly-2-vinylpyridine, polyvinylpyridine halides, polyvinyl imidazoles, polylysine, polyvinyl alcohol, polyvinyl pyrrolidone, polyvinylidine chloride, polyvinyl chloride, polyethers, polycarboxylic acids, polysulphonic acids, polymeric quaternary ammonium halides including polyvinylbenzyl trimethylammonium chloride and polyvinyl pyridium halides, cellulosic carboxylates, cellulosic sulphates, cellulosic ethers, copolymers and mixture thereof.

* * * * *

UNITED STATES PATENT AND TRADEMARK OFFICE
CERTIFICATE OF CORRECTION

PATENT NO. : 5,256,337
DATED : 10/26/93
INVENTOR(S) : Jerome L. Reid and Pauline Do It is certified that error appears in the above-indentified patent and that said Letters Patent is hereby corrected as shown below:

Claim 1, column 9, line 64, delete "secret" and substitute therefore -- second --.

Signed and Sealed this

Nineteenth Day of April, 1994

Attest:

BRUCE LEHMAN

Attesting Officer     Commissioner of Patents and Trademarks